(12) United States Patent
Deng

(10) Patent No.: US 12,221,540 B2
(45) Date of Patent: Feb. 11, 2025

(54) COMPOSITE PLASTIC MATERIAL AND LAMP STRUCTURES MADE THEREOF

(71) Applicant: Yi Deng, Foshan (CN)

(72) Inventor: Yi Deng, Foshan (CN)

(73) Assignee: Yi Deng, Foshan (CN)

( * ) Notice: Subject to any disclaimer, the term of this patent is extended or adjusted under 35 U.S.C. 154(b) by 0 days.

(21) Appl. No.: 17/054,557

(22) PCT Filed: Nov. 10, 2020

(86) PCT No.: PCT/CN2020/127648
§ 371 (c)(1),
(2) Date: Nov. 11, 2020

(87) PCT Pub. No.: WO2022/099430
PCT Pub. Date: May 19, 2022

(65) Prior Publication Data
US 2023/0265286 A1    Aug. 24, 2023

(51) Int. Cl.
| | | |
|---|---|---|
| *C08L 77/00* | (2006.01) |
| *C08K 3/08* | (2006.01) |
| *C08K 3/26* | (2006.01) |
| *C08K 7/14* | (2006.01) |
| *F21S 41/19* | (2018.01) |
| *F21S 45/48* | (2018.01) |
| *F21V 15/01* | (2006.01) |
| *F21V 29/87* | (2015.01) |
| *F21S 45/30* | (2018.01) |

(52) U.S. Cl.
CPC ............... *C08L 77/00* (2013.01); *C08K 3/08* (2013.01); *C08K 3/26* (2013.01); *C08K 7/14* (2013.01); *F21S 41/19* (2018.01); *F21S 45/48* (2018.01); *F21V 15/01* (2013.01); *F21V 29/87* (2015.01); *C08K 2003/265* (2013.01); *C08K 2201/014* (2013.01); *C08L 2203/20* (2013.01); *F21S 45/30* (2018.01)

(58) Field of Classification Search
CPC ...... B60Q 1/00; B60Q 1/0011; B60Q 1/0035; B60Q 1/0041; B60Q 1/007; B60Q 1/0064; B60Q 1/0416; C08L 2203/20; C08L 77/00; C08K 2003/265; C08K 2201/014; F21S 41/19; F21S 45/48; F21V 15/01; F21V 29/87
See application file for complete search history.

(56) References Cited

U.S. PATENT DOCUMENTS

2015/0275063 A1* 10/2015 Raman .................. C09K 5/14
                                                     252/75
2019/0242547 A1*  8/2019 Zhang .................. F21K 9/66
2020/0096173 A1*  3/2020 Zhang .................. F21V 29/745

* cited by examiner

*Primary Examiner* — Elmito Breval
(74) *Attorney, Agent, or Firm* — NZ CARR LAW OFFICE

(57) ABSTRACT

The present disclosure provides a lamp structure including a shell made of a thermal plastic material with improved heat conductivity. In some embodiments, the thermal plastic material includes a thermal conductive filler comprising nylon, calcium carbonate, metal power, glass fiber, and paraffin wax.

14 Claims, 4 Drawing Sheets

SECTION A-A

COMPOSITE PLASTIC MATERIAL AND LAMP STRUCTURES MADE THEREOF

FIELD

The present disclosure relates a composite plastic material for making vehicle parts, and lamp structures made thereof.

BACKGROUND

Some vehicle parts, such as vehicle lamp structures, are usually made of aluminum alloy. The cost to manufacturing aluminum alloy parts is relatively high. And sometimes, the aluminum alloy reacts to acid and/or alkali in the environment and erode, thus, reduces its life span. Compared to plastic parts, aluminum alloy also has a higher density.

Therefore, there is a need for vehicle parts made with improved material.

SUMMARY

The present disclosure provides a thermal conductive filler composition, a plastic material including the thermal conductive filler, and a lamp structure having a shell made of a plastic material including the thermal conductive filler.

Embodiments of the present disclosure provides a thermal plastic filler composition, comprising about 30% to about 50% by weight of nylon, and about 30% to about 50% by weight of calcium carbonate.

Some embodiments of the present disclosure provide a thermal plastic material, comprising about 70% to about 30% of a thermoplastic about 30% to about 70% of the thermal plastic filler according to embodiments of the present disclosure.

Some embodiments provide a vehicle lamp structure including a shell formed from a thermal plastic material according to embodiments of the present disclosure, and a lighting unit in contact with the shell.

Some embodiments provide lamp structure comprises a shell, a transparent window attached to the shell, wherein the shell and the transparent window define an inner volume, and a lighting unit disposed in the inner volume, wherein the lighting unit includes a printed circuit board (PCB), the PCB includes one or more lights on a front surface, and a back surface of the PCB is pressed against the an inner wall of the shell.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

Figure 1:
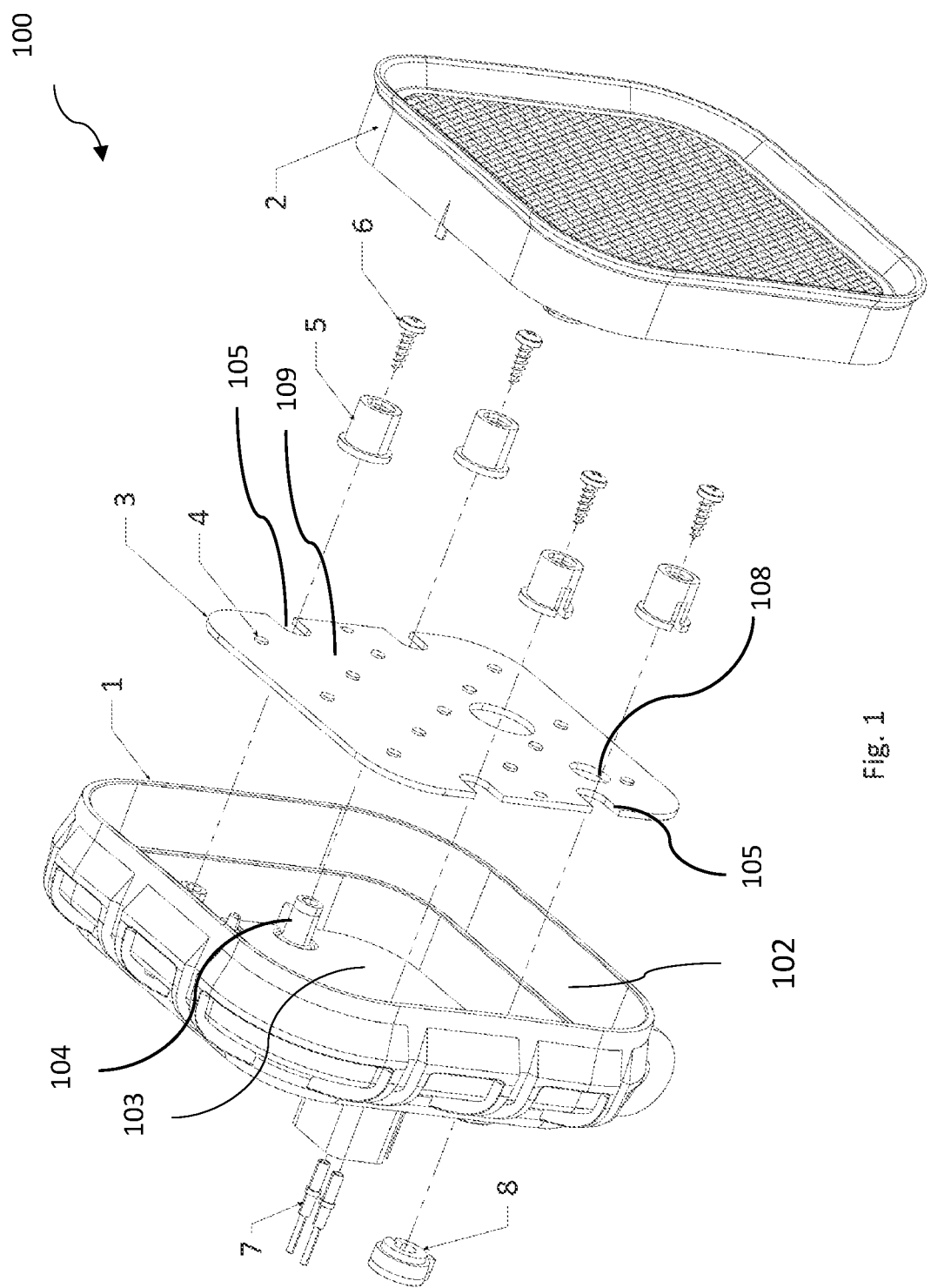
FIG. 1 is a schematic explosive view of a lamp structure according to one embodiment of the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The present disclosure relates a composite plastic material with conductive fillers, and structures made thereof. Particularly, embodiments of the present disclosure relate to vehicle lamp structures or working lamp structures made with a composite plastic material for improved heat conductivity. According to the present disclosure, vehicle lamp structures or working lamp structures include shells made with plastic material having a thermal conductive filler according to embodiments of the present disclosure. In some embodiments, the thermal conductive filler includes one or more of nylon, calcium carbonate, aluminum powder, glass fiber, and industrial paraffin.

In the state-of-the art applications, working lamps and vehicle lamps typically have shells made of aluminum alloy, which results in heavy lamp bodies, high processing cost, low resistance to acidic and alkali environments, and a short life span. Compared to the state-of-the-art technologies, lamp structures according to the present disclosure are light weight, with reduced processing costs, improved resistance to corrosion and aging.

Figure 2:
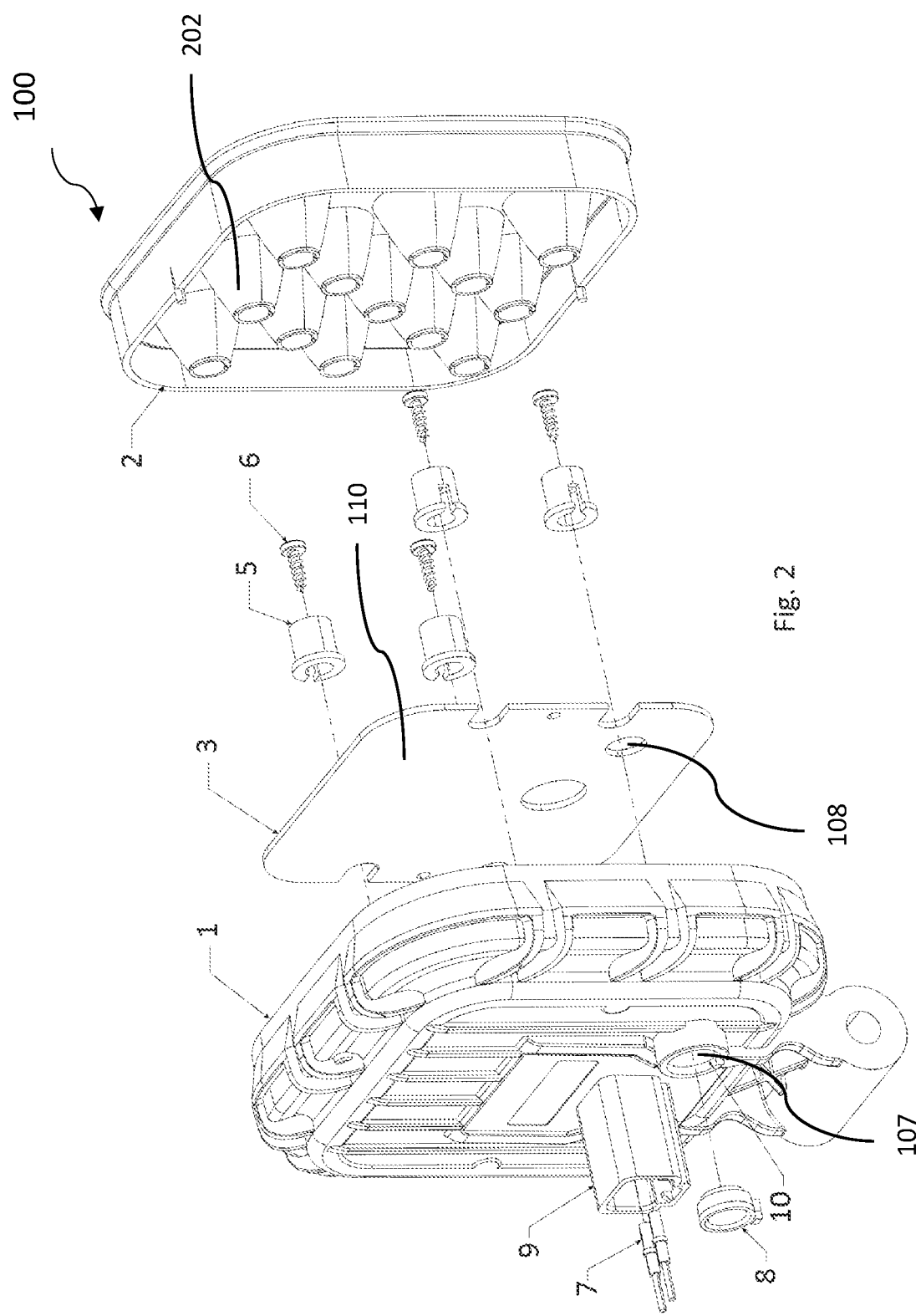
FIG. 2 is another schematic explosive view of the lamp structure of FIG. 1.
Figure 5:
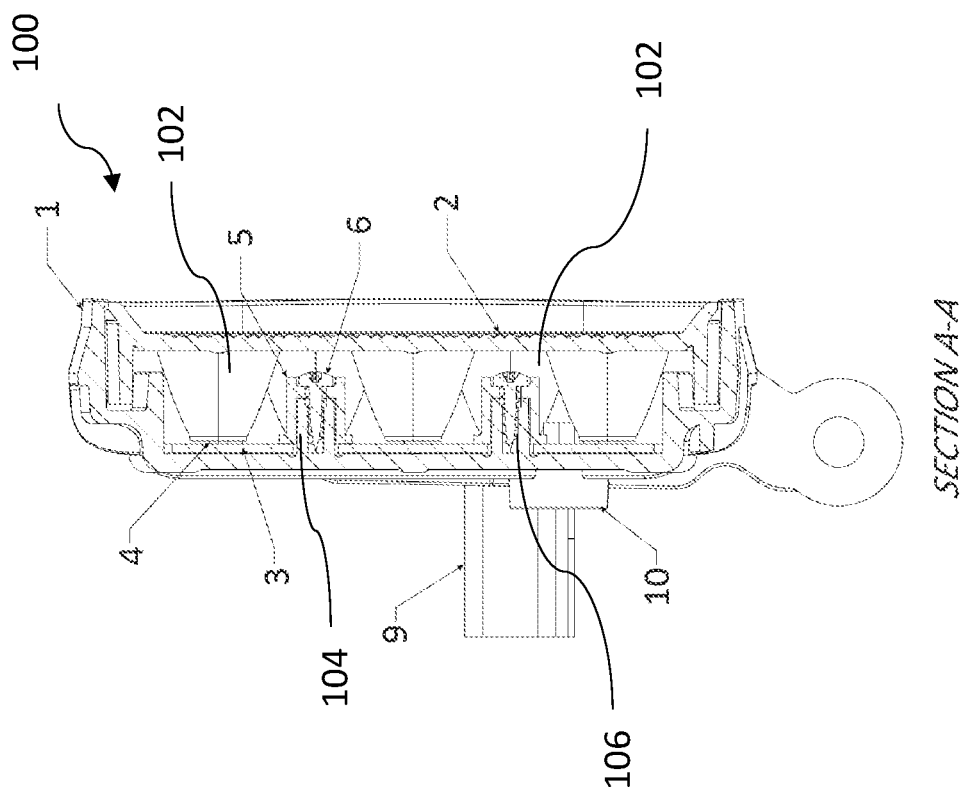
FIG. 5 is a schematic vertical sectional view of the lamp structure of FIG. 1.
Figure 3:
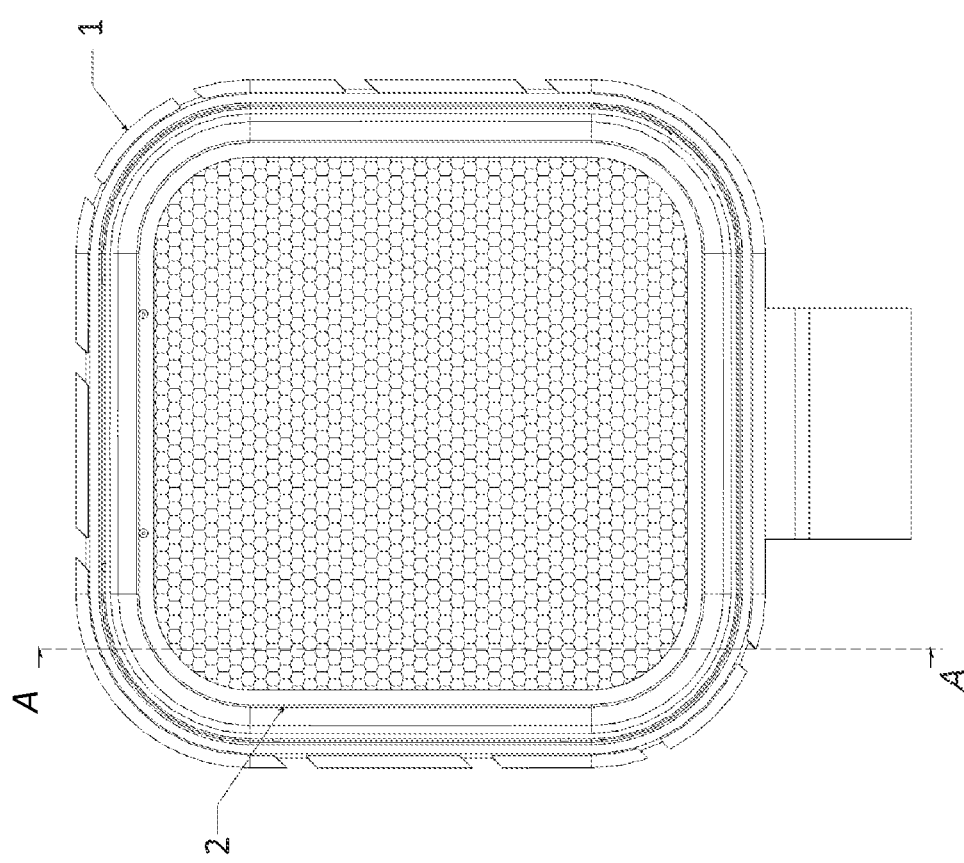
FIG. 3 is a schematic plan view of the lamp structure of FIG. 1.
Figure 4:
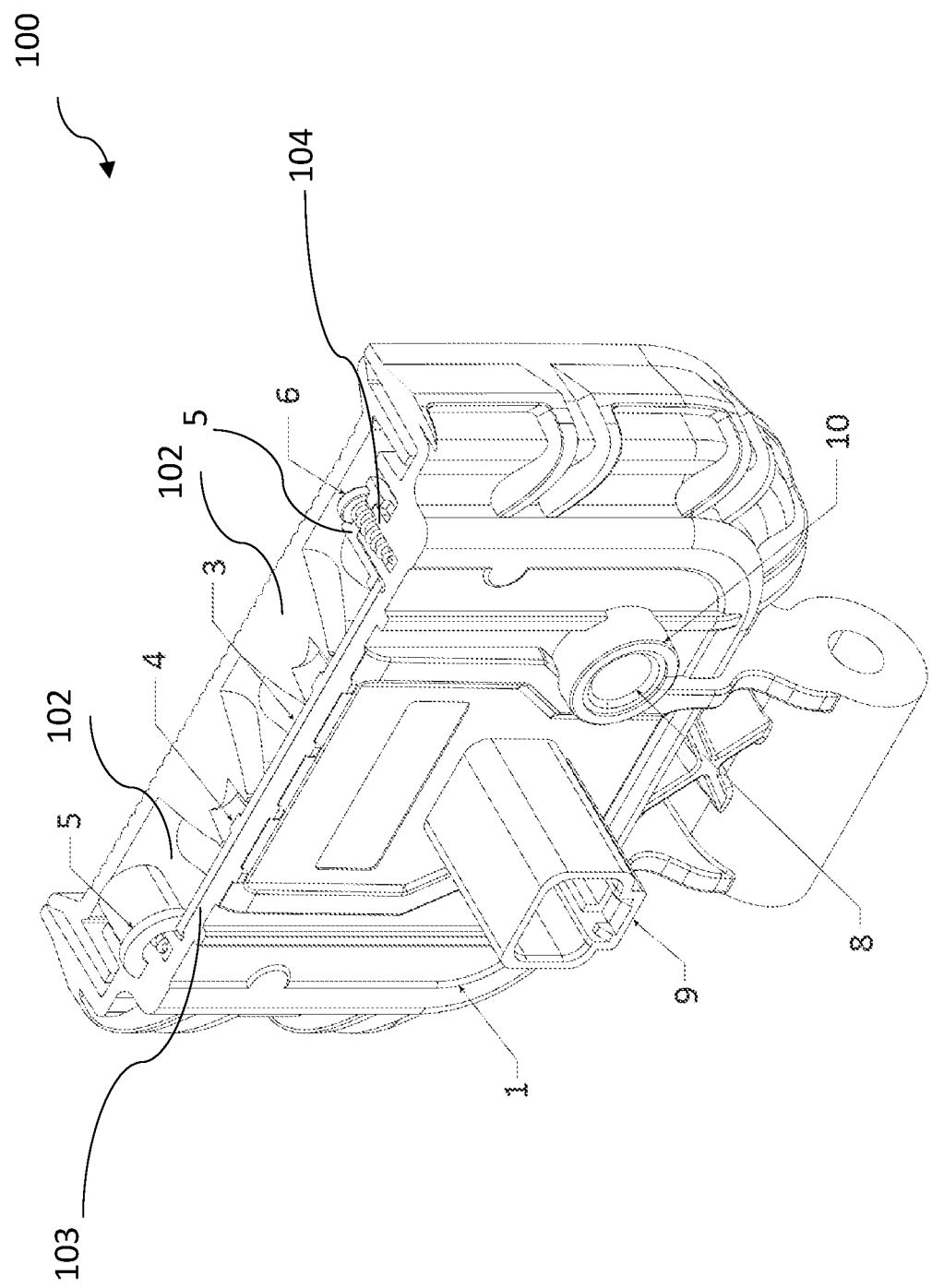
FIG. 4 is a schematic perspective sectional view of the lamp structure of FIG. 1.

FIG. 1 is a schematic explosive view of a lamp structure 100 according to one embodiment of the present disclosure. FIG. 2 is another schematic explosive view of the lamp structure 100. FIG. 3 is a schematic plan view of the lamp structure 100. FIG. 4 is a schematic perspective sectional view of the lamp structure 100. FIG. 5 is a schematic vertical sectional view of the lamp structure 100.

The lamp structure 100 may be used as vehicle head lamps. In some embodiments, the lamp structure 100 includes a shell 1 and a transparent window 2. The transparent window 2 is attached to the shell 1 forming an inner volume 102 for holding a lighting unit 3 therein. The transparent window 2 may be designed to provide desired optical function for the lamp structure 100. In some embodiments, the lighting unit 3 may be a light emitting diodes (LED) unit. The lighting unit 3 may include a printed circuit board (PCB) having one or more LED lights 4 and control circuits formed thereon. In some embodiments, one or more light shades 202 may extend from the transparent window 2. The light shades 202 may be aligned with the LED lights 4 on the lighting unit 3 to achieve desired lighting effect.

In some embodiments, the PCB of the lighting unit 3 is in thermal contact with the shell 1 so that the PCB and the LED lights 4 can be cooled and ventilated through the shell 1. The LED lights 4 are disposed on a front surface 109 of the lighting unit 3. The shell 1 may be formed with a composite material according to embodiments of the present disclosure. In some embodiments, the shell 1 is formed from a plastic material with a thermal conductive filler. The thermal conductive filler has a composition according to the present disclosure, as discussed below. In some embodiments, the lighting unit 3 is in direct contact with the shell 1 so that electronic circuits in the lighting unit 3 can be cooled through the shell 1.

In some embodiments, a back surface 110 of the PCB board of the lighting unit 3 is in direct contact with an inner wall 103 of the shell 1. As shown in FIGS. 1, 2, 4, and 5, the back surface 110 of the PCB board of the lighting unit 3 is secured to and pressed against the inner wall 103 of the shell 1 by one or more screws 6. At least one screw column 104 extends from the inner wall 103 of the shell 1. Each screw column 104 has a screw hole 106 formed therein. At least one notch 105 is formed through the PCB board of the lighting unit 3. Each notch 105 configured to align with one screw column 104 of the shell 1. In some embodiments, the arrangement of the notches 105 and the screw columns 104 is used to align and secure the lighting unit 3 in the shell 1. The screw columns 104 extend through notches 105 of the lighting unit 3 to allow the lighting unit 3 in direct contact with the inner wall 103 of the shell 1. Screw caps 5 are sleeved over the screw columns 104 and cover the notches 105 of the PCB board of the lighting unit 3. The screws 6 are fastened into the screw holes in the screw column 104 to press the screw caps 5 against the lighting unit 3 and the lighting unit 3 against the inner wall 103 of the shell 1, thus, forming and maintaining thermal contact between the lighting unit 3 and the shell 1.

In some embodiments, the lamp structure 100 includes a ventilation port 10 configured to selectively connect the inner volume 102 with an exterior environment. In some embodiments, the ventilation port 10 is formed at a through hole 107 of the shell 1. The PCB board of the lighting unit 3 includes a through hole 108. The through hole 107 aligns with the through hole 108 when assembled to establish a flow path between the inner volume 102 and the exterior environment. A breathing valve 8 is disposed in the through hole 107. In some embodiments, the breathing valve 8 may be selectively open or closed by pressure differential between the inner volume 102 and the exterior environment. The breathing valve 8 prevents condensation or moisture built up due to temperature change.

The lamp structure 100 further includes a power connection block 9 to provide electric power supply to the light unit 3. The power connection block 9 may be designed to receive a power supply 7 from a vehicle. The power connection block 9 may include power connection pins embedded during injection molding process. The power connection block 9 may be formed from the thermal conductive composite material according to the present disclosure. In some embodiments, the power connection block 9 is integrally formed on the shell 1.

As discussed above, the lamp structure 100 according to the present disclosure includes a thermal plastic material with improved cooling effect. The thermal plastic material includes a plastic and a thermal conductive filler according to the present disclosure. The thermal plastic material includes the thermal conductive filler in a range between about 30% and about 70% by weight, for example in a range between about 40% and about 60% by weight. The plastic may be a thermoplastic, such as polyethylene (PE), polypropylene (PP), polystyrene (PS), polyvinylchloride (PVC), or any suitable plastic material. The thermoplastic may be in a range between about 70% and 30% by weight, for example in a range between about 60% and 40%.

Articles, such as the shell 1, may be formed from the thermal plastic material with the thermal conductive filler by injection molding.

In some embodiments, the thermal conductive filler may include one of more nylons (polyamide). The thermal conductive filler may include any suitable type of nylon, such as nylon 6, nylon 66, nylon 6/6-6, nylon 6/9, nylon 6/10, nylon 6/12, nylon 11, nylon12, or a combination thereof. The nylon may be a homopolymer, co-polymer or reinforced. In some embodiments, the thermal conductive filler includes one or more nylons in a range between about 30% to about 50% by weight, for example in a range between about 37% to about 47% by weight.

In some embodiments, the thermal conductive filler includes calcium carbonate ($CACO_3$). In some embodiments, the thermal conductive filler includes calcium carbonate in a range between about 30% to about 50% by weight, for example in an range between about 35% to about 45% by weight.

In some embodiments, the thermal conductive filler includes a metal powder, for example aluminum power, or any suitable powder of metals with desirable thermal conductivity. In some embodiments, the thermal conductive filler includes a combination of metal powders. In some embodiments, the thermal conductive filler includes a metal powder in a range between about 8% to about 18% by weight, for example in a range between about 10% to about 15% by weight.

In some embodiments, the thermal conductive filler includes a fiber, for example a glass fiber, or any suitable fiber. In some embodiments, the thermal conductive filler includes a fiber in a range between about 2% to about 10% by weight, for example in a range between about 4% to about 8% by weight.

In some embodiments, the thermal conductive filler includes a paraffin wax, for example industrial paraffin. In some embodiments, the thermal conductive filler includes a fiber in paraffin wax in less than 8% by weight, for example in a range between about 2% to about 5% by weight.

EXAMPLE

The shell 1 of the lamp structure is made of thermal plastic material including a plastic including about 50% by weight of a thermal conductive filler according to the present disclosure. The thermal conductive filler includes nylon in about 38-42% by weight, calcium carbonate in about 37-41% by weight, aluminum powder in about 10-15% by weight, glass fiber in about 4-8% by weight, and paraffin wax in 3-5% by weight.

By adding thermal conductive filler, the present disclosure improves the thermal conductivity of plastic materials, which is light in weight, high in corrosion resistance, simple in processing, and low in cost.

Even though a vehicle light assembly is described above, the thermal plastic material and the thermal plastic filler according to the present disclosure may be used in any device, apparatus, or equipment where rapid heat dissipation is desired.

Embodiments of the present disclosure provides a thermal plastic filler composition, comprising about 30% to about 50% by weight of nylon, and about 30% to about 50% by weight of calcium carbonate.

In one or more embodiments, the composition further comprises about 10% to about 15% by weight of metal powder.

In one or more embodiments, the composition further comprises about 4% to about 8% by weight of glass fiber.

In one or more embodiments, the composition further comprises about 2% to about 6% by weight of paraffin wax.

Some embodiments of the present disclosure provide a thermal plastic material, comprising about 70% to about 30% of a thermoplastic about 30% to about 70% of the thermal plastic filler according to embodiments of the present disclosure.

Some embodiments provide a vehicle lamp structure including a shell formed from a thermal plastic material according to embodiments of the present disclosure, and a lighting unit in contact with the shell.

Some embodiments provide lamp structure comprises a shell, a transparent window attached to the shell, wherein the shell and the transparent window define an inner volume, and a lighting unit disposed in the inner volume, wherein the lighting unit includes a printed circuit board (PCB), the PCB includes one or more lights on a front surface, and a back surface of the PCB is pressed against the an inner wall of the shell.

In one or more embodiments, the shell is made of a plastic material added with 40-60% by weight of a thermal conductive filler.

In one or more embodiments, the thermal conductive filler comprises nylon, calcium carbonate, metal powder, glass fiber, and industrial paraffin.

In one or more embodiments, the thermal conductive filler comprises: about 30% to about 50% by weight of nylon, and about 30% to about 50% by weight of calcium carbonate.

In one or more embodiments, the lamp structure further comprises a breathing valve disposed in a through hole formed through the shell.

In one or more embodiments, the shell includes one or more screw columns extending from the inner wall, wherein the one or more screw columns extend through notches formed in the PCB.

In one or more embodiments, the lamp structure further comprises one or more screw caps, wherein each screw cap sleeves over a screw column and presses on the front surface of the PCB, and one or more screws fastened to screw holes in the one or more screw columns.

In one or more embodiments, the PCB has a through hole aligned with the through hole through the shell.

In one or more embodiments, the lamp structure further comprises a power connection block integrally formed on the shell.

While the foregoing is directed to embodiments of the present disclosure, other and further embodiments of the disclosure may be devised without departing from the basic scope thereof.

The invention claimed is:

1. A lamp structure, comprising:
   a shell, wherein the shell is made of a plastic material added with 40-60% by weight of a thermal conductive filler;
   a transparent window attached to the shell, wherein the shell and the transparent window define an inner volume; and
   a lighting unit disposed in the inner volume, wherein the lighting unit includes a printed circuit board (PCB), the PCB includes one or more lights on a front surface, and a back surface of the PCB is pressed against an inner wall of the shell.

2. The lamp structure of claim 1, wherein the thermal conductive filler comprises:
   nylon;
   calcium carbonate;
   metal powder;
   glass fiber; and
   industrial paraffin.

3. The lamp structure of claim 2, wherein the thermal conductive filler comprises:
   about 30% to about 50% by weight of nylon; and
   about 30% to about 50% by weight of calcium carbonate.

4. The lamp structure of claim 1, further comprising:
   a breathing valve disposed in a through hole formed through the shell.

5. The lamp structure of claim 4, wherein the PCB has a through hole aligned with the through hole through the shell.

6. The lamp structure of claim 1, wherein the shell includes:
   one or more screw columns extending from the inner wall, wherein the one or more screw columns extend through notches formed in the PCB.

7. The lamp structure of claim 6, further comprising:
   one or more screw caps, wherein each screw cap sleeves over a screw column and presses on the front surface of the PCB; and
   one or more screws fastened to screw holes in the one or more screw columns.

8. The lamp structure of claim 1, further comprising a power connection block integrally formed on the shell.

9. A lamp structure, comprising:
   a shell;
   a transparent window attached to the shell, wherein the shell and the transparent window define an inner volume; and
   a lighting unit disposed in the inner volume, wherein the lighting unit includes a printed circuit board (PCB), the PCB includes one or more lights on a front surface, and a back surface of the PCB is pressed against an inner wall of the shell, wherein the shell made of a plastic material comprising a thermal conductive filler, and the thermal conductive filler comprises:
   about 30% to about 50% by weight of nylon; and
   about 30% to about 50% by weight of calcium carbonate.

10. The lamp structure of claim 9, wherein the plastic material comprises:
    about 70% to about 30% of a thermoplastic; and
    about 30% to about 70% of the thermal plastic filler.

11. The lamp structure of claim 10, wherein the thermal conductive filler further comprises:
    metal powder;
    glass fiber; and
    industrial paraffin.

12. The lamp structure of claim 10, wherein the thermal plastic filler comprises:
    about 10% to about 15% by weight of metal powder.

13. The lamp structure of claim 12, wherein the thermal plastic filler further comprises:
    about 4% to about 8% by weight of glass fiber.

14. The lamp structure of claim 13, wherein the thermal plastic filler further comprises:
    about 2% to about 6% by weight of paraffin wax.

* * * * *